United States Patent [19]
Humphrey et al.

[11] Patent Number: 5,959,967
[45] Date of Patent: Sep. 28, 1999

[54] DIGITAL TRANSMISSION SYSTEM

[75] Inventors: Leslie Derek Humphrey, Harlow; Christopher Tate, Herts, both of United Kingdom

[73] Assignee: Northern Telecom Limited, Montreal, Canada

[21] Appl. No.: 08/894,021
[22] PCT Filed: Aug. 16, 1996
[86] PCT No.: PCT/GB96/02008
§ 371 Date: Jul. 24, 1997
§ 102(e) Date: Jul. 24, 1997
[87] PCT Pub. No.: WO97/07619
PCT Pub. Date: Feb. 27, 1997

[30] Foreign Application Priority Data

Aug. 19, 1995 [GB] United Kingdom .................... 9517034

[51] Int. Cl.$^6$ .............................. H04L 23/02; H04L 27/28
[52] U.S. Cl. .......................... 370/208; 370/203; 375/261
[58] Field of Search .................................. 370/203, 208, 370/206, 210, 294, 295, 480, 497, 286, 290, 291; 375/260, 261; 379/93.01

[56] References Cited

U.S. PATENT DOCUMENTS 5,483,529  1/1996  Baggen et al. ........................ 375/260
5,818,813  10/1998  Saito et al. ............................. 370/208

Primary Examiner—Chi H. Pham
Assistant Examiner—Afsar M. Qureshi
Attorney, Agent, or Firm—Lee, Mann, Smith, McWilliams, Sweeney & Ohlson

[57] ABSTRACT

An orthogonal frequency division multiplex (OFDM) transmission system, e.g. for tranmitting data traffic over a telephone subscriber twisted pair loop, includes a transmitter for generating sets of time division samples in respective channels corresponding to an input data sequence comprising a series of bits, and a receiver coupled to the transmitter via the transmission path. The receiver incorporates a time variant digital filter having a plurality of elements one for each said channel, and Fourier transform means for recovering the data stream from the outputs of said filter elements. The time variant digital filter comprises a set of wavelet filters one for each transmission channel and whose tap weights are determined so as to provide specific interference rejection.

7 Claims, 5 Drawing Sheets

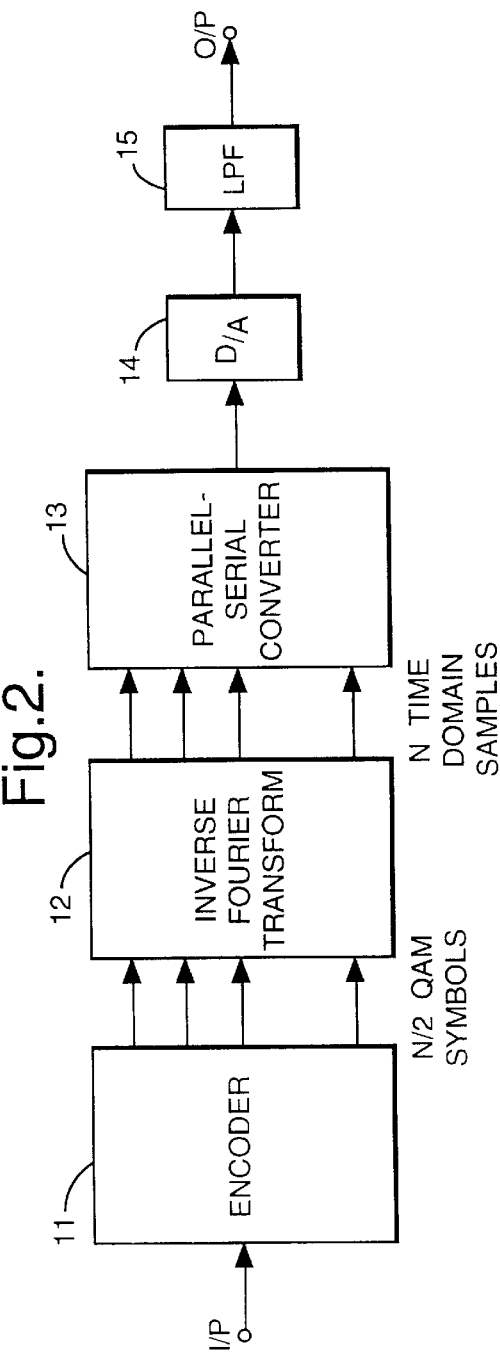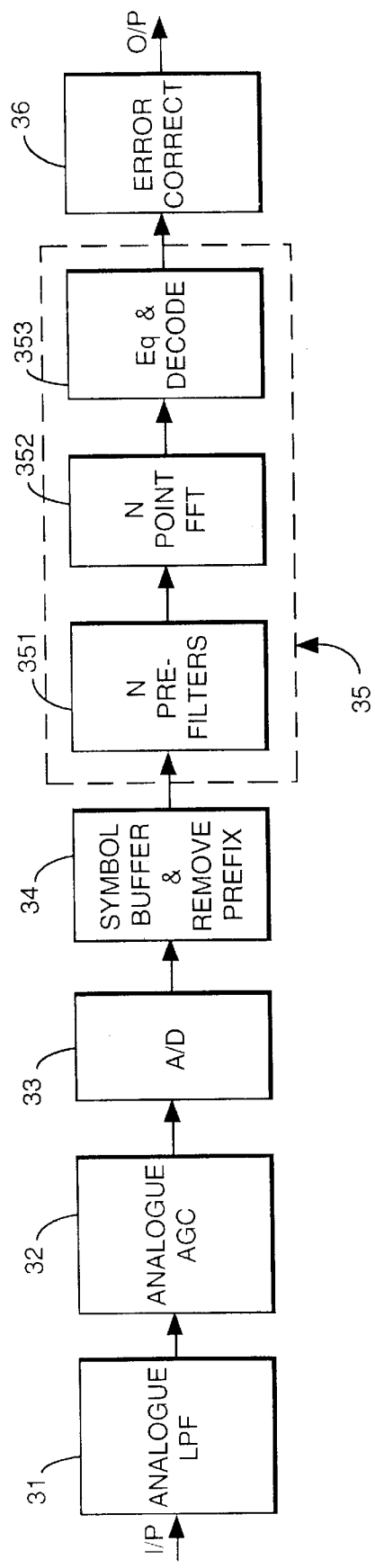

DIGITAL TRANSMISSION SYSTEM

This invention relates to telecommunications systems and in particular to an arrangement and method for transmitting signals over a subscriber loop.

BACKGROUND OF THE INVENTION

Telecommunication networks were originally developed to provide voice communications between subscriber terminals. With the experience of such networks from the traditional telephone or POTS service into the provision of a variety of digital series, there is now a need to provide improved subscriber access to the network. Traditionally subscribers are coupled to the network with a twisted pair wire loop commonly referred to us the subscriber loop. The costs of replacing these loops with more efficient or higher bandwidth connections, e.g. a coaxial connection, is prohibitive and various techniques have therefore been proposed for providing effective digital across over the subscriber loop. A recently introduced transmission technique is the orthogonal frequency division multiplex (OFDM) protocol. This technique comprises a multi-carrier modulation scheme which achieves a very low co-channel interference over dispersive channels by the use of a cyclic prefix on each data symbol. In contrast to conventional frequency division multiplex (FDM) techniques, no complex time division equalisation is required. A description of this technique is given by J Bingham in IEEE Communications Magazine 28(4) pp 5–14 —April 1990 and by A Peled and A Ruiz in 'International Conference on Acoustics, Speech and Signal Processing' April 1980, Denver, pp 964 to 967. Further descriptions of OFDM techniques are given in specification No EP-A2-0656705 and specification No U.S. Pat. No. 4,884,139.

Orthogonal frequency division multiplex is ideally suited to digital transmission applications, and has been implemented using standard fast Fourier transform (FFT) techniques. However, the application of this technique to telecommunications subscriber loop technology, where the transmission path comprises a twisted copper pair, has been restricted by its susceptibility to high level tone interference. In such circumstances, the rejection offered by conventional FFT processing has been found insufficient to prevent significant data corruption.

The object of the invention is to minimise or to overcome this disadvantage.

SUMMARY OF THE INVENTION

According to one aspect of the invention there is provided an orthogonal frequency division multiplex (OFDM) transmission system, including a transmitter having means for generating from an input bit stream sets of N time division samples in respective channels corresponding to an input data sequence comprising a series of bits, N being an integer, and a receiver coupled to the transmitter via a transmission path, the receiver incorporating a time variant digital filter and Fourier transform means for recovering the data stream from the output of said filter, wherein the time variant digital filter comprises a set of wavelet filters one for each transmission channel and whose tap weights are determined so as to provide specific interference rejection, and wherein the filter has an impulse response which is short in comparison with the Fourier transform order.

According to a further aspect of the invention there is provided a method of transmitting a digital data sequence comprising a series of bits over a transmission path, the method including generating sets of time division samples in respective channels corresponding to the input data sequence, transmitting said samples over the transmission path to a receiver incorporating a time variant digital filter having a plurality of elements one for each said channel, and determining a Fourier transform of the outputs of the filter elements whereby to recover the data stream, wherein the time variant digital filter comprises a set of wavelet filters one for each transmission channel and whose tap weights are determined so as to provide specific interference rejection.

The arrangement provides a means of digital transmission, e.g. over a telephone subscriber twisted pair loop, using a block orthogonal coding scheme. In particular it relates to a transmission coding scheme using a set of basis vectors generated by an inverse discrete Fourier transform (IFFT) in which cyclic extension of the signal block is effected by samples inserted before or after the coded symbol. The receiver employed in the arrangement uses a discrete Fourier transform (DFT) to implement a correlating detector. In this receiver, the use of a time varying digital filter before the Fourier transform provides a significant reduction in susceptibility to non-coherent interference.

BRIEF DESCRIPTION OF THE DRAWINGS

An embodiment of the invention will now be described with reference to the accompanying drawings in which:

FIG. 2 is a schematic diagram of an OFDM transmitter for use in the system of FIG. 1;

FIG. 3 is a block schematic diagram of an OFDM receiver for use in the system of FIG. 1;

DESCRIPTION OF PREFERRED EMBODIMENT

Figure 1:
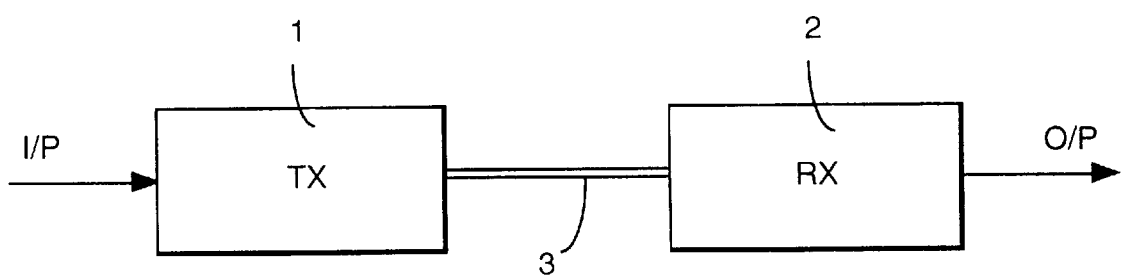
FIG. 1 is a highly schematic diagram of an OFDM transmission system according to the invention.

Referring to FIG. 1, the system includes an OFDM transmitter (1) and receiver (2) coupled by a transmission path (3) typically comprising a twisted pair telephone line. Digital signals which are input to the transmitter are converted to OFDM signals for transmission over the path. At the receiver, the OFDM signals are decoded to recover the original digital signal which is then fed to a subscriber terminal (not shown).

Referring now to FIG. 2 which shows the OFDM transmitter of FIG. 1, an input digital serial bit stream having a bit rate of D bits per second (b/s) is buffered by an input buffer 11 into N/2 parallel data blocks each block comprising a number bits allocated on the basis of the respective channel signal to noise ratio. Thus more bits will be allocated to quieter channels and vice versa. The number of data bits per block may be allocated from a predetermined knowledge of the characteristics of the transmission channel or the number may be set during start up initialisation via an automatic rate negotiation process between the two ends of the transmission link. This involves sounding the transmission link with a predetermined digital sequence to establish the signal to noise ratio for each of the complex exponentials in the set.

Advantageously the number N of data blocks is a power of two. Each set of N/2 data blocks is encoded as a corresponding set of N/2 quadrature amplitude modulation (QAM) sub symbols whose phase and amplitude represent the respective data blocks. The information in each block of $B_i$ bits is mapped on to a set of mutually orthogonal carriers such that the $B_i$ bits are encoded by complex amplitude modulation representing a set of allowed amplitude and phase points for each carrier. The transmitter signal is constructed by performing a sequence of inverse discrete Fourier transforms (IFFT 12) whereby the amplitude and phase of each complex exponential is selected from the allowed set by the $B_i$ bits allocated to the carrier $C_i$. The continuous stream of complex data samples is combined and frequency shifted by the IFFT 12 to produce a real time domain data stream.

In order to preserve the orthogonal nature of the carriers when the channel is subject to dispersion, we insert extra signal samples (cyclic prepended extension samples) at the start of each transform output block so that the transformed data set is prepended with a block or prefix of P samples. This extends the orthogonality over a period of greater length than the transform window and allows some degree of offset between the ideal and actual receive synchronisation and also allows the symbol boundary disturbance to decay to an insignificant level before the received signal is sampled.

The output of the inverse fast Fourier transform (IFFT) device 12 is fed via a parallel to serial converter 13 to a digital to analogue (D/A) converter 14 and a low pass filter 15 for transmission to a receiver. During the parallel to serial conversion the prefix is added to the set of N real time division samples output from the IFFT 12 providing a set of N+P samples, where P represents the added prefix. The sampling rate of the D/A converter 14 is greater than the sampling rate of the encoder 11 to allow for these added prefixes. Typically, the transmission path includes a twisted pair telephone subscriber loop.

Referring now to FIG. 3 which depicts in schematic form the OFDM receiver of the transmission system of FIG. 1, the received OFDM signals are passed through an analogue low pass filter 31 and an analogue AGC circuit 32 to an analogue to digital converter 33. The resulting digital signal is fed via a prefix removal stage 34 to a time variant OFDM filter 35 where the original data channels are reconstituted. These parallel channels are then output via an error detection circuit 36. The receiver provides enhanced rejection of interference by implementing a separate wavelet shaping filter for each channel. The impulse response of this filter is short in comparison with the Fourier transform order so that significant attenuation is obtained while requiring the insertion of only a modest number of cyclic prepended extension samples.

Figure 4:
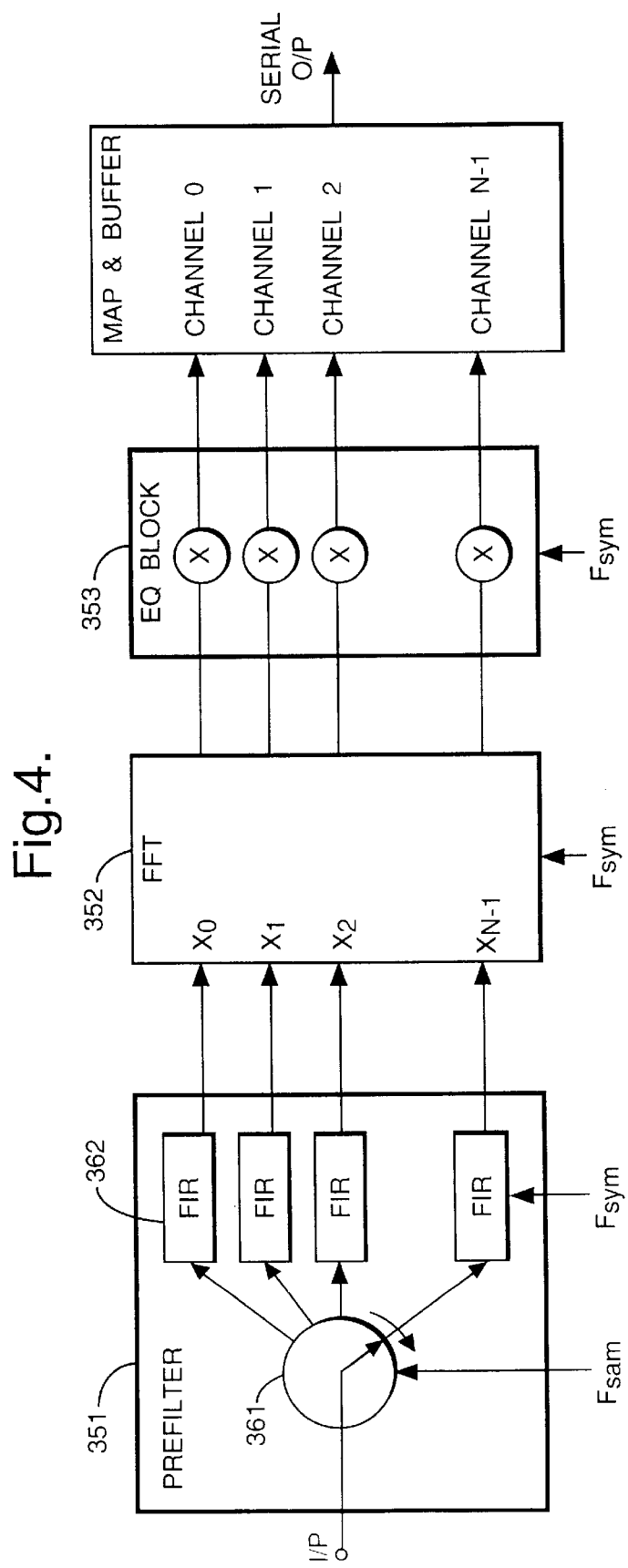
FIG. 4 shows the detail of a digital filter arrangement for use with the receiver of FIG. 3.
Figure 5:
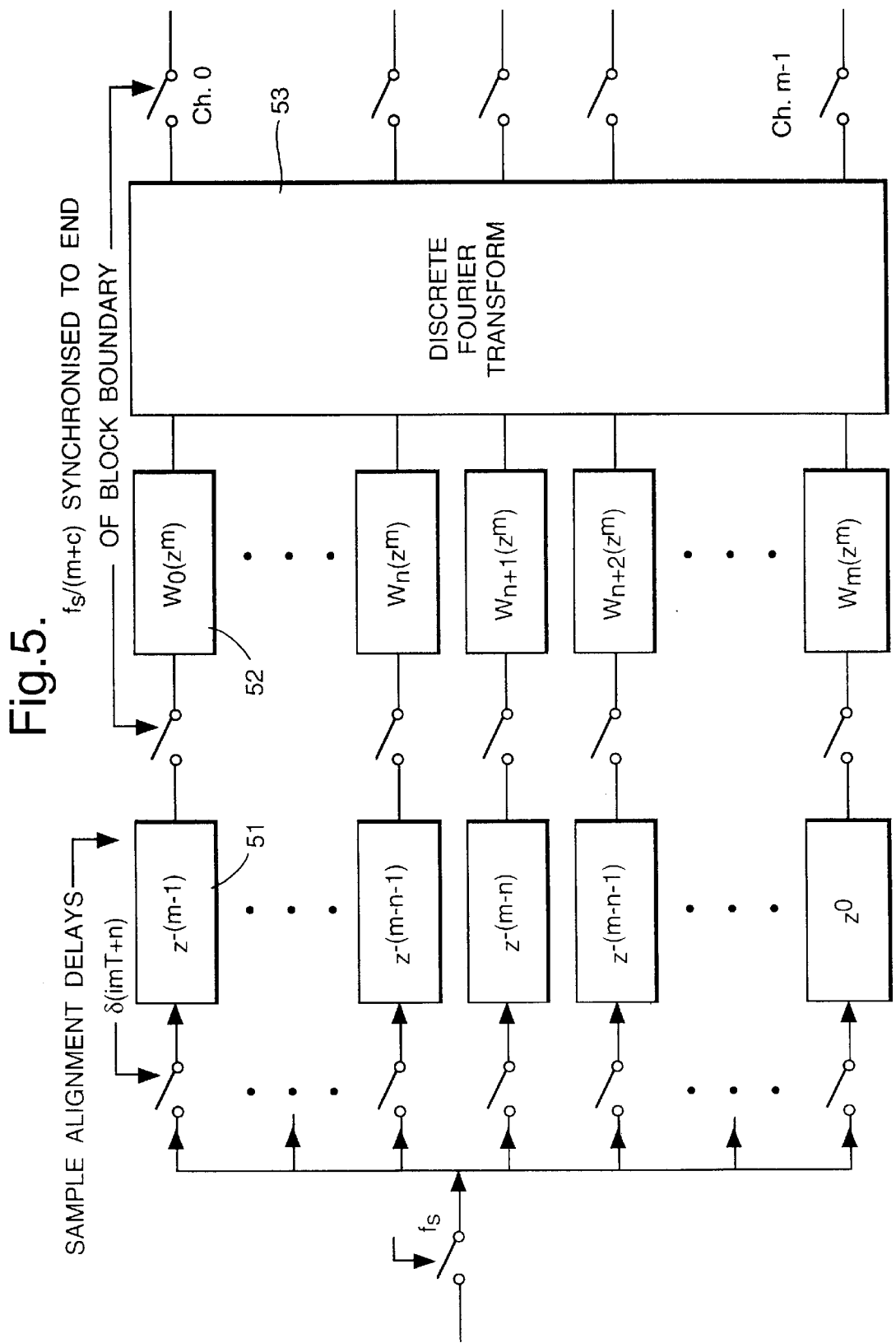
FIG. 5 shows further detail of the filter arrangement of FIG. 3.

FIGS. 4 and 5 show the time variant filter assembly 35 of FIG. 3 in further detail. As shown in FIG. 4, the filter assembly includes a prefilter 351 wherein input samples are fed selectively into a commutator 361 to each one of an array of taps 362. The commutator 361 is operated at the sampling rate $F_{sam}$ and the taps are operated at the symbol rate $F_{sym}$. The relationship between the sample rate and the symbol rate is given by the expression $$F_{sym} = F_{sam}(N+P)$$

where N is the number of channels and P is the cyclic prefix. Use of a power of two block size allows a highly efficient implementation based on a fast Fourier transform. A cyclic prepended extension typically of about 10 to 15% and preferably about 12.5% provides a trade off which yields significant benefit in reducing susceptibility of the transmitted signmals to interference at a relatively modest cost in bandwidth.

FIG. 5 shows the prefilter in further detail. This comprises a first order filter having the characteristic, $$H_n = \sum i = 0 \cdots (p-1)\Omega^{i \cdot n} z^{-i} \text{ where } \Omega = e^{2\pi j/m}$$

The architecture shown in FIG. 5 implements this filter as a time variant filter at the input to the Fourier transform. The arrangement comprises a set of delay elements 51 and correspopnding filters 52 providing the inputs to the discrete Fourier transform device 53. This provides a multichannel implementation of the OFDM receiver with shared filter architecture comprising multiple wavelet shaping filters $f = H_n(z)$.

The following definitions apply to this filter architecture
$G(z) = (1-z^{-n})/(1-z^{-1})$
m=Fourier block length
c=cyclic extension length
$\Omega^m = -1$ $\Omega = \theta^{2\pi j/m}$
p=filter length
$H'(z) = (\Sigma_{i=0 \ldots (p-1)} h_i z^{-i}) \times G(z) = \Sigma_{i=0 \ldots (p+m-2)} h'_i z^{-i}$
$W_n(z^m) = \Sigma_{(valid\ i)} h'_{(m.i-n)} z^{-mi}$
$\delta(t)$=dirac pulse at time t
$T = m/f_s$ Alternatively, the filter can be viewed as a set of separate time invariant filters for the individual Fourier transform inputs where the tap weights are obtained from $H_0(z)$ by sampling its tap weights over a period equal to the Fourier transform order. Where p is short, most of the sub filters default to a single tap with unity coefficients except for the first p inputs of the transform where the sub filters will be two-tap.

In the arrangement of FIGS. 4 and 5, a filter response is defined which represents the response of a non-decimating channel 0 (i.e. zero freq.) OFDM receiver. The response for other OFDM channels is simply a frequency shifted version of this basic response. In the case of the conventional OFDM receiver this would simply be the Fourier transform of the rectangular FFT window. The response for the improved rejection OFDM receiver of FIGS. 4 and 5 described here is the product of the prototype responses of the conventional OFDM receiver and the chosen pre-filter. Hence, the impulse response is the convolution of the rectangular FFT window and the pre-filter impulse response.

Our improved OFDM system employing an N point DFT/FFT and a time variant pre-filter with an impulse response of M samples gives a composite prototype impulse response of length L=(N+M−1) samples. Since only a single transform is required per symbol, a decimation factor equal to the symbol length, N+P, allows a considerable complexity saving in the implemented pre-filter. Each pre-filter (one per FFT bin) is operated at the decimated rate and has coefficients determined by sub-sampling the overall prototype filter impulse response. A section of an N channel OFDM receiver is shown using N pre-filters with (L/N)+1 taps each and a single N point FFT. In this system, the pre-filters and the FFT operate at the $F_{sam}/(N+P)$ and produce down-sampled outputs for each channel in parallel. The impulse response of the pre-filter should ideally be short in comparison with the transform length in order that the prefix size can be minimised with respect to the symbol length. Excepting this, the precise pre-filter response is arbitrary provided that it has the desired spectral characteristics. In order to simplify the modified OFDM implementation, the pre-filter can be chosen to have an impulse response which minimises the multiplication hardware requirement. The choice of a rectangular shape for the pre-filter response delivers coefficients which can be represented with low precision binary words saving both storage and multiplication hardware. Other pre-filter responses based on cascaded rectangular impulse responses can also be used to give greater interference rejection albeit at some increase in complexity.

In circumstances where large interferer signals are spaced in a regular fashion across the OFDM spectrum (e.g. in broadcast radio pick-up where carriers are allocated on a fixed frequency spacing) it is possible to arrange for the OFDM modulation system (and the pre-filter) to have 'notches' of high attenuation at the relevant frequencies. This involves appropriate selection of the OFDM parameters and the pre-filter response.

Figure 6:
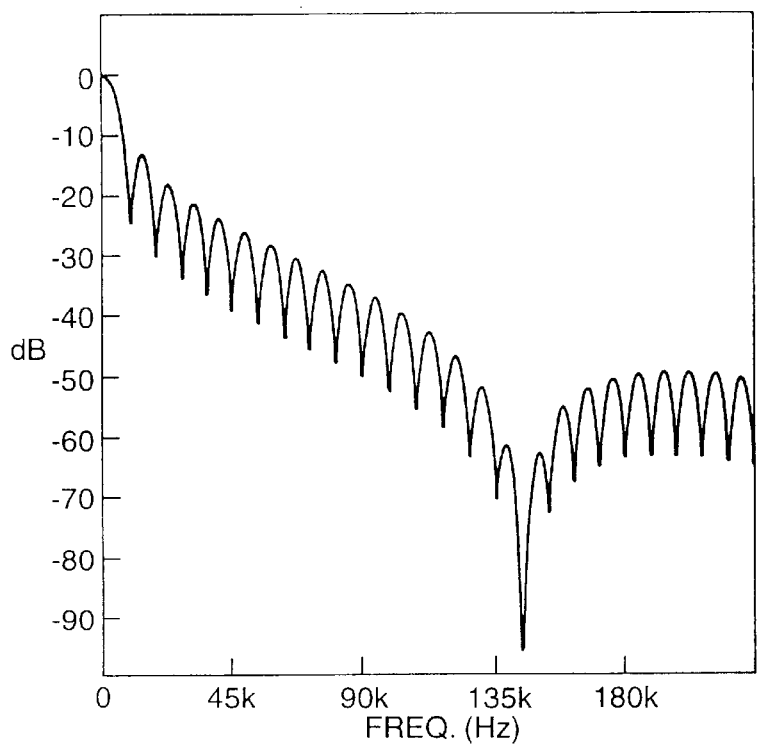
FIG. 6 illustrates the interference rejection achieved by the filter arrangement of FIG. 5 using a single stage rectangular impulse response.
Figure 7:
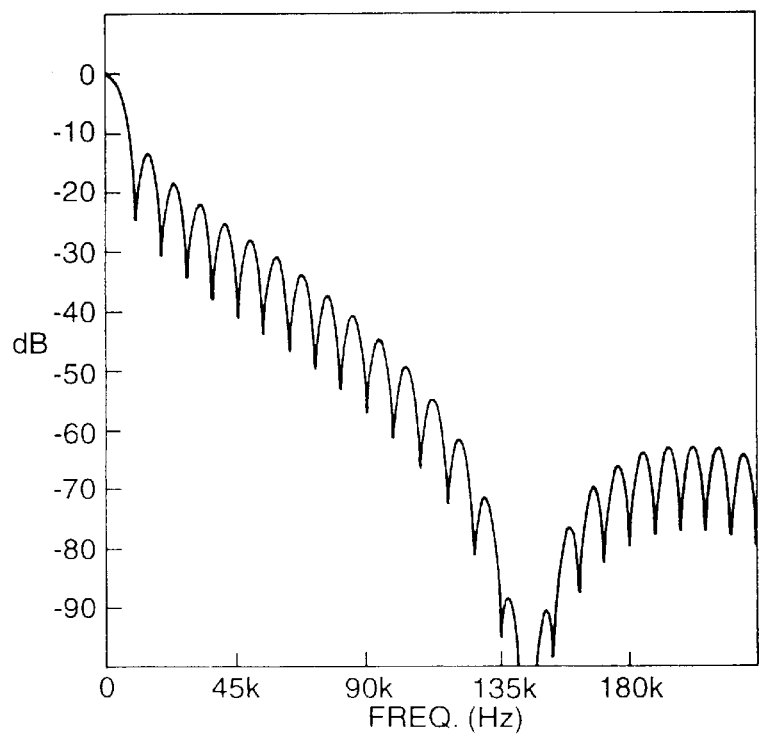
FIG. 7 illustrates the interference rejection achieved by the filter arrangement of FIG. 5 using a dual stage cascaded rectangular impulse response.

For example, a system based on a symbol rate, $F_{sym}$, of 8 kHz and an OFDM carrier spacing, $F_{car}$, of 9 kHz has been investigated. This system employed a sampling rate, $F_{sam}$, of 2.304MHz and a FFT size, N, of 256 points giving a cyclic prefix, P, of 32 samples. This provided a 9 kHz carrier spacing which suits the rejection of medium wave AM broadcasts. Several pre-filter options based on rectangular impulse responses were also investigated: a single 16 tap, a dual cascaded 16 tap, and a cascade of a 16 tap and a 12 tap. FIG. 6 shows the response of the receiver (for the OFDM carrier at DC) to interference for a single 16 tap pre-filter and FIG. 7 shows equivalent results for a dual cascaded 16 tap pre-filter.

The OFDM technique described above can be extended to implement multi-point to point communication thus allowing a number of transmitters to share the bandwidth of one receiver. This may be achieved by allocating one carrier to each transmitter, avoiding carriers potentially subject to interference. The various transmitters are controlled so as to adjust their transmission levels to substantially equalise the received signal levels thus minimising the dynamic range required for analogue to digital conversion. In a further modification, the Fourier transform block size can be increased and the transmission rate reduced to provide the same transmission capacity but allocating more than one carrier to each transmitter.

We claim:

1. An orthogonal frequency division multiplex (OFDM) transmission system, including a transmitter having means for generating from an input bit stream sets of N time division samples in respective channels corresponding to an input data sequence comprising a series of bits, N being an integer, and a receiver coupled to the transmitter via a transmission path, the receiver incorporating a time variant digital filter and Fourier transform means for recovering the data stream from the output of said filter, wherein the time variant digital filter comprises a set of wavelet filters one for each transmission channel and whose tap weights are determined so as to provide specific interference rejection, and wherein the filter has an impulse response which is short in comparison with the Fourier transform order.

2. A system as claimed in claim 1, wherein the transmission path comprises a telephone subscriber loop.

3. A system as claimed in claim 1, wherein the transmitter includes means for allocating bits of the data sequence to the channels whereby a greater number of bits are allocated to those channels subject to a low level of interference and a lesser number of bits are allocated to those channels subject to a high level of interference.

4. A system as claimed in claim 1, wherein the transmitter has means for prepending a said set of N samples with a prefix of P samples where P is an integer less than N.

5. A system as claimed in claim 4, wherein said prefix comprises a cyclic prepended extension of between 10 and 15%.

6. A method of transmitting a digital data sequence comprising a series of bits over a transmission path, the method including generating sets of time division samples in respective channels corresponding to the input data sequence, transmitting said samples over the transmission path to a receiver incorporating a time variant digital filter having a plurality of elements one for each said channel, and determining a Fourier transform of the outputs of the filter elements whereby to recover the data stream, wherein the time variant digital filter comprises a set of wavelet filters one for each transmission channel and whose tap weights are determined so as to provide specific interference rejection.

7. A method as claimed in claim 6, wherein the transmission path comprises a telephone subscriber loop.

* * * * *